June 28, 1966 W. L. SCHNEIDER ETAL 3,257,854
FLUID BEARING GYROSCOPES
Filed Sept. 1, 1961
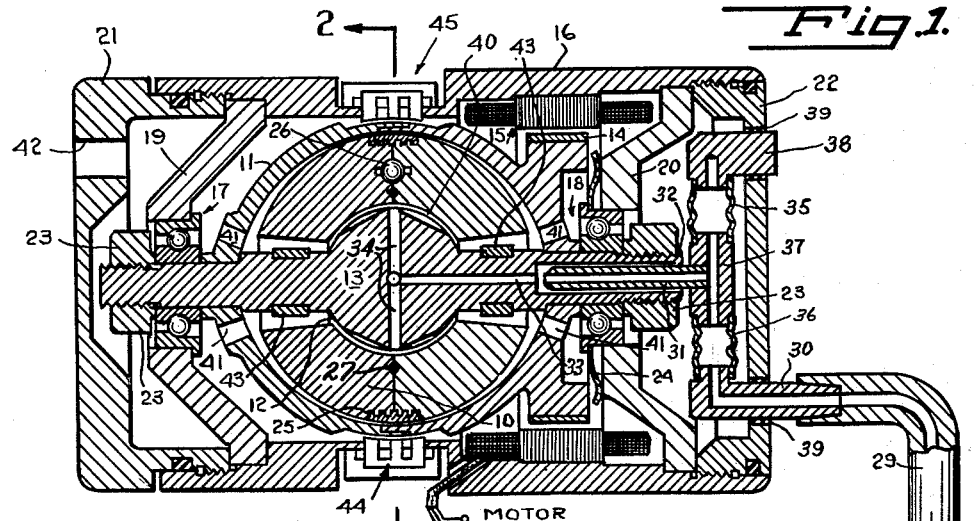
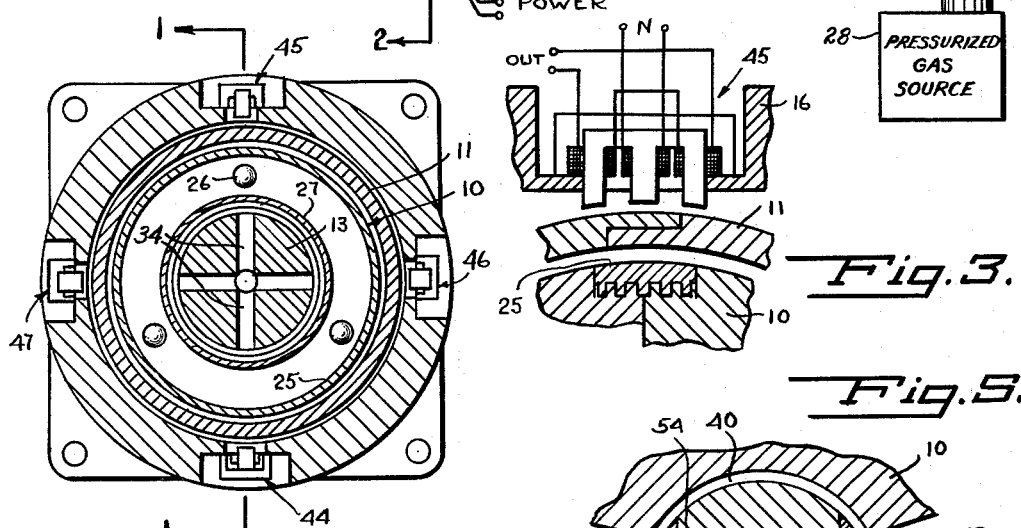
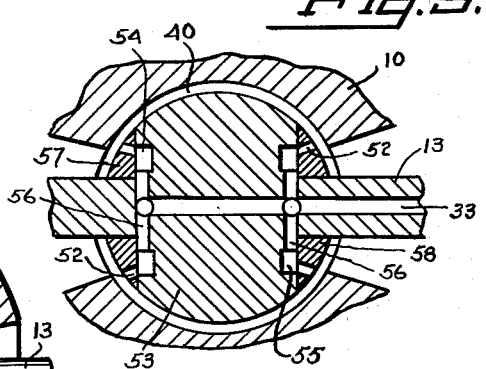
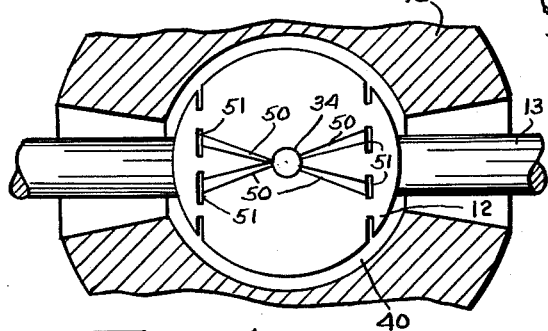
INVENTORS.
WALTER L. SCHNEIDER
LOREN E. CURRISTON
JOHN L. EVANS
BY
Raymond A. Paquin
ATTORNEY.

3,257,854
FLUID BEARING GYROSCOPES
Walter L. Schneider, Levittown, Loren E. Curriston, Syosset, and John L. Evans, Wantagh, N.Y., assignors to American Bosch Arma Corporation, a corporation of New York
Filed Sept. 1, 1961, Ser. No. 135,662
10 Claims. (Cl. 74—5.7)

This invention relates to gyroscopes and has particular reference to fluid supported gyroscopes.

The gas bearing gyroscope, in which a free rotor is supported on a spherical three-axis pressurized gas bearing, has become prominent in recent years. Much attention has been given to the self-acting or hydrodynamic gas bearing where the fluid pressure is generated by the rotating gyro itself. In distinction to the hydrodynamic type, the present invention uses a pressurized gas bearing and provides a number of important advantages, some of which are that the spin motor can be completely isolated from the free rotor and the pressurized bearing eliminates the problem of wear during starts and stops. In the persent invention, the bearing and the gyroscopic wheel are rotated at the same angular velocity whence accidental contact will not cause serious bearing damage and any asymmetrical torques in the gas bearing are averaged to zero.

Further, in the present invention, the bearing and gyro wheel are operated in a chamber which is attached to the shaft and offers a rotating environmental shield to reduce spurious gas flow torques which might act on the inertia wheel.

For a more complete understanding of the invention, reference may be had to the accompanying diagrams in which:

FIG. 1 is a longitudinal cross section of the gyroscope with the cutting plane along line 1—1 of FIG. 2;

FIG. 2 is a cross sectional view of the gyroscope taken along line 2—2 of FIG. 1;

FIG. 3 is a detailed view of the pickoff and torquing arrangement for the gyroscope of FIGURES 1 and 2;

FIG. 4 is a detailed view of the outer surface of the inner member of the spherical bearing; and FIG. 5 is a longitudinal cross section of another spherical bearing structure.

Referring now to FIGURES 1 and 2, the inertial or gyroscopic wheel 10 is substantially in the form of a thick hollow sphere which encloses the spherical bearing surface 12 formed on the shaft 13 in a spherical cavity. Shaft 13 also carries a larger substantially spherical shell 11 which is formed of two portions and surrounds the wheel 10. The right portion of shell 11 carries the hysteresis ring 14 of the rotor of a synchronous motor, the stator structure and windings 15 of which are held in the substantially cylindrical casing 16. Shaft 13 is journalled in bearings 17 and 18 which are fitted in the bearing supports 19 and 20 respectively held securely in casing 16 by the end caps 21 and 22 respectively which are screwed into the casing 16.

The inner races of bearings 17, 18 are urged against the shell 11 to hold the two portions of shell 11 securely on the shaft 13 by the lock nuts 23 which are threaded on both ends of shaft 13. The bearings 17, 18 are preloaded by the spring washer 24, located between the outer race of bearing 18 and the bearing support 20.

The inertia wheel 10 is made in two halves which are held together by the hysteresis ring 25. The threads in ring 25 and cooperating threads on the wheel 10 resemble those of a turnbuckle permitting the two halves of wheel 10 to be drawn tightly together. The halves are initially registered by the locating devices or balls 26 and the joint between the halves is made gas tight by the sealing ring 27.

Pressurized gas, such as air, is fed from an external source 28 through pipe 29 to the inlet pipe 30. Clear passage for the gas to the bearing surface 12 is provided by the quill-like projection 31 which fits in a mating cylindrical bore 32 in the shaft 13, the longitudinal passageway 33 from recess 32 to the center of the gas bearing and thence to a plurality of radial passageways 34 which lead to the surface 12 of the gas bearing. The quill projection 31 is supported in a flexible mounting provided by the bellows 35, 36 which hold the short pipe 37 from which the quill 31 projects between the inlet pipe 30 and the upper support 38. The pipe 30 and support 38 are held securely in end cap 22 by an adhesive 39. Small clearance in the bore 32 provides an effective seal and gas bearing for unhindered rotation of the shaft 13 about quill 31.

The pressurized gas flows through radial passage 34 into the gap 40 between surface 12 and the inertia wheel 10 and escapes from the extremities of the gap 40 into the interior of shell 11. The gas is permitted to flow out of the shell 11 through holes 41 and further out of the entire gyro interior through at least one hole 42 in one end cap, e.g., cap 21. The gas film in gap 40 produces the frictionless support for wheel 10 which provides freedom to tilt about any axis perpendicular to shaft 13. The maximum angle of tilt is limited to the angle at which the sides of the conical bores in wheel 10 through which shaft 13 passes come into contact with the resilient stops 43 on shaft 13.

The tilt is normally kept to a small value by action of a servo follow-up system (not shown) which is responsive to the tilts detected by pickoff devices 44, 45 about one axis and pickoff devices 46, 47 about an axis perpendicular thereto. A typical pickoff 45 is shown in FIG. 3 and includes a magnetic core of E laminations, having coils wound on each leg. The center coil is energized by an alternating voltage and the difference of voltages induced in the two coils about the outer legs is indicative of the position of the magnetic ring 25 with respect to the center leg of the pickoff core. For proper functioning of the pickoff, the gyro wheel 10 must not be magnetic, and therefore it is made of non-magnetic steel. The outputs of opposing pickoffs 44, 45 are added so that only tilt, or rotational displacements of the gyro wheel 10 will be detected while translational displacements of the gyro wheel 10 will not produce an output signal.

The pickoffs 44, 45 also may be employed to apply torques to the ring 25 by applying controlled D.C. to the outer coils, to tend to tilt the ring 25 to either one side or the other. By employing both the pickoff and torquing properties built into the gyroscope, the gyro can be used in all types of gyroscopic instruments including compasses, stabilized platforms, etc., as is well known in the art.

In operation of the instrument in FIG. 1, the pressurized gas is fed to the bearing surface 12 to lift the wheel 10 off the bearing surface 12. Motor windings in the stator structure 15 are then energized to rotate the shell 11 and shaft 13 at high speed. The wheel 10 being freely suspended takes up the rotation of the shell and shaft due to the coupling of the gas in the gap 40 and in the gap between the wheel 10 and shell 11. The spacing between the wheel 10 and shell 11 is much greater than the gap 40, however, so that no lifting effect will be noted but gas friction does take place due to small relative motions between the shell 11 and wheel 10 which may be caused by slip or misalignment. Small transient misalignments between wheel 10 and shell 11 resulting from servo threshold limitations will cause simple harmonic shearing motion of the wheel 10 through the gas contained in the shell 11. It has been found that these gas shearing forces are the predominant angular restraints on the gyro rotor and determine its time constant. It will be seen, therefore, that the gyro of this invention has a minimum amount of angular coupling of the wheel 10 to the shell 11.

The enviromental shell 11 is actually a moving container for the gas surrounding the wheel 10 and acts to reduce the spurious gas flow torques acting on the inertial element. Also, the shell 11 permits magnetic and thermal isolation of the sensitive element including wheel 10 from the driving motor.

The configuration of the gas flow ports on the surface 12 is shown in FIG. 4. Each radial passageway 34 leads at the surface into a plurality of wedge shaped depressions such as 50, each of which increases in both depth and width with distance from passageway 34. Each depression 50 terminates in a circumferential slot such as 51, which slot however, does not connect with the adjacent slots. Each of the slots 51 extends in a plane perpendicular to the axis of shaft 13. The configuration here described uses only four radial passageways 34 from the center of the sphere, and the ease of manufacture provided by this configuration gives it certain advantages over other types of spherical bearings.

FIGURE 5 shows another possible configuration of the inner bearing structure wherein the central opening 33 is connected to annularly arranged ports 52 which permit the gas to enter the gap 40 near the extremities of the gap, i.e., near the edge of the central bore in the gyro wheel 10. For ease of fabrication, the bearing comprises a centtral flange 53 on shaft 13 in which annular channels 54, 55 are cut. These channels are connected to the central opening by a plurality of passageways 56. End caps 57, 58 which are secured to the flange 53 by any convenient means, are provided with the annularly arranged ports 52 which communicate with channels 54, 55. The outer surface of the end caps 57, 58 and flange 53 are all finished together to a smooth spherical shape.

We claim:
1. In a gyroscope, a housing, a shaft journalled in said housing, a substantially spherical body on said shaft, a mass having a spherical cavity surrounding said body, a casing attached to said shaft and enclosing said mass, motive means for rotating said shaft, body and casing, and means for supplying pressurized gas between said spherical body and the spherical cavity of said mass.

2. In a gyroscope, a shaft, a substantially spherical projection on said shaft, an axial passageway in said shaft from one end of said shaft to said projection, a plurality of passageways from said axial passageway to the surface of said spherical projection, a mass having a spherical cavity therein and surrounding said spherical projection, a casing on said shaft surrounding said mass, motive means for rotating said shaft and said casing, and means for supplying pressurized gas to said axial passageway.

3. In a gyroscope, a shaft, a substantially spherical projection on said shaft, an axial passageway in said shaft from one end of said shaft to said projection, a plurality of passageways from said axial passageway to the surface of said spherical projection, a mass having a spherical cavity therein and surrounding said spherical projection, a casing on said shaft surrounding said mass, motive means for rotating said shaft and said casing, means for supplying pressurized gas to said axial passageway, and a plurality of grooves in said surface emanating from each of said passageways.

4. In a gyroscope, a shaft, a substantially spherical projection on said shaft, an axial passageway in said shaft from one end of said shaft to said projection, a plurality of passageways from said axial passageway to the surface of said spherical projection, a mass having a spherical cavity therein and surrounding said spherical projection, a casing on said shaft surrounding said mass, motive means for rotating said shaft and said casing, and means for supplying pressurized gas to said axial passageway, said last-named means including a slender tube telescoped within said axial passageway, means for supporting said slender tube in substantial fixed relation, and a source of pressurized gas connected to said tube.

5. In a gyroscope, a housing, a shaft journalled in said housing, a substantially spherical body on said shaft, a mass having a spherical cavity surrounding said spherical body, a casing attached to said shaft and enclosing said mass, motive means for rotating said shaft, spherical body and casing, and means for supplying pressurized gas between said spherical body and the spherical cavity of said mass, said mass having a substantially spherical outer surface and said casing having a substantially spherical inner cavity.

6. In a gyroscope, a housing, a shaft journalled in said housing, a substantially spherical body on said shaft, a mass having a spherical cavity surrounding said spherical body, a casing attached to said shaft and enclosing said mass, motive means for rotating said shaft, spherical body and casing, and means for supplying pressurized gas between said spherical body and the spherical cavity of said mass, said mass comprising a pair of nonmagnetic substantially semi-spherical bodies, a magnetic band joining said bodies, pickoff means on said housing for detecting the position of said magnetic band.

7. In a gyroscope, a shaft, a substantially spherical projection on said shaft, an axial passageway in said shaft from one end of said shaft to said projection, a mass having a spherical cavity therein and surrounding said spherical projection, a casing on said shaft surrounding said mass, motive means for rotating said shaft and said casing, means for supplying pressurized gas to said axial passageway, a plurality of annular passageways in said spherical projection, a plurality of transverse passageways in said spherical projection leading from said axial passageway to said annular passageways, and a plurality of annularly spaced ports between the surface of said spherical projector and said annular passageways.

8. In a gyroscope, a shaft, a substantially spherical projection on said shaft, an axial passageway in said shaft from one end of said shaft to said projection, a plurality of radial passageways from said axial passageway to the surface of said spherical projection, a mass having a spherical cavity therein and surrounding said spherical projection, a casing on said shaft surrounding said mass, motive means for rotating said shaft and said casing, means for supplying pressurized gas to said axial passageway, and escape ports for said gas communicating between the interior and exterior of said casing.

9. In a gyroscope: a support structure; a substantially spherical rotor member mounted from said structure and rotatable with respect to said structure about an axis through said member; a gyro mass having inner surfaces defining a first substantially spherical cavity larger than, and enclosing said member; a shell having inner surfaces defining a second cavity larger than, and enclosing, said gyro mass, said shell being mounted for rotation with said rotor member; motive means for rotating said rotor member and said shell together about said axis; a source of pressurized gas; and means for supplying a flow of said gas from said source through the region between said rotor member and said inner surfaces of said gyro mass to support said gyro mass, whereby said mass is spaced from aid rotor member and from said shell and caused to rotate with them.

10. The apparatus of claim 9, in which said means for supplying gas comprises a plurality of passageways and openings in said rotor member for ejecting gas from said rotor member into said region at a plurality of points.

References Cited by the Examiner

UNITED STATES PATENTS

| | | | |
|---|---|---|---|
| 1,890,831 | 12/1932 | Smyth | 74—5.7 X |
| 2,613,538 | 10/1952 | Edelstein | 74—5.37 |
| 2,960,873 | 11/1960 | Lundberg | 74—5 |

MILTON KAUFMAN, *Primary Examiner.*

BROUGHTON G. DURHAM, *Examiner.*

T. W. SHEAR, *Assistant Examiner.*